(12) United States Patent
Dernovsek et al.

(10) Patent No.: US 7,391,168 B1
(45) Date of Patent: Jun. 24, 2008

(54) DIGITAL CONTROL OF ELECTRONIC BALLASTS USING AC POWER LINES AS A COMMUNICATION MEDIUM

(75) Inventors: John Jay Dernovsek, Madison, AL (US); Deepak Shet, Schaumburg, IL (US); Brett Bell, Scottsboro, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 0 days.

(21) Appl. No.: 11/332,503

(22) Filed: Jan. 13, 2006

Related U.S. Application Data

(60) Provisional application No. 60/643,558, filed on Jan. 13, 2005.

(51) Int. Cl.
*H05B 37/02* (2006.01)
*G05B 11/01* (2006.01)

(52) U.S. Cl. .................................. 315/291; 340/310.14

(58) Field of Classification Search ............. 315/200 R, 315/224, 246, 289, 290, 291, 362; 340/310.11, 340/310.13, 310.14, 870.3, 870.4, 870.39; 375/259
See application file for complete search history.

(56) References Cited

U.S. PATENT DOCUMENTS

| | | | | |
|---|---|---|---|---|
| 3,818,466 A | * | 6/1974 | Honda | 340/517 |
| 4,348,582 A | * | 9/1982 | Budek | 219/483 |
| 4,408,185 A | * | 10/1983 | Rasmussen | 307/3 |
| 5,264,823 A | * | 11/1993 | Stevens | 375/238 |
| 6,377,163 B1 | * | 4/2002 | Deller et al. | 307/2 |
| 2004/0164688 A1 | * | 8/2004 | Van Tichelen et al. | 315/292 |

* cited by examiner

*Primary Examiner*—Thuy Vinh Tran
(74) *Attorney, Agent, or Firm*—Waddey & Patterson; Mark J. Patterson

(57) ABSTRACT

A system for establishing communications between a central lighting controller and a series of electronic dimming ballasts uses an AC power supply line as a communication medium. A MOSFET switched by a control circuit selectively shorts the AC power lines when a rectified version of the power line signal indicates that the power line signal is nearing a zero crossing to create notches in the AC power signal. A simple receiver in each of the ballasts detects the presence or absence of notches in the power signal and interprets the results as digital data indicating a desired dimming level for each of the ballast. The ballasts then adjust their light output accordingly.

16 Claims, 3 Drawing Sheets

Top: Voltage waveform of proposed PLC circuit showing "notch" in voltage on both ascending and descending zero-voltage crossings.
Bottom: Pulse waveform generated by the detection circuit.

Proposed circuit for Power Line Communications

Output of the bridge rectifier of proposed PLC circuit

Top: Voltage waveform of proposed PLC circuit showing "notch" in voltage on both ascending and descending zero-voltage crossings.
Bottom: Pulse waveform generated by the detection circuit.

DIGITAL CONTROL OF ELECTRONIC BALLASTS USING AC POWER LINES AS A COMMUNICATION MEDIUM

CROSS-REFERENCES TO RELATED APPLICATIONS

This application is a utility application which claims benefit of co-pending provisional U.S. Patent Application Ser. No. 60/643,558 filed Jan. 13, 2005, entitled "Digital Control of Electronic Ballasts Using AC Power Lines as Communication Medium" which is hereby incorporated by reference.

STATEMENT REGARDING FEDERALLY SPONSORED RESEARCH OR DEVELOPMENT

Not Applicable.

REFERENCE TO SEQUENCE LISTING OR COMPUTER PROGRAM LISTING APPENDIX

Not Applicable

BACKGROUND OF THE INVENTION

There are variety of methods of communicating over power lines known in the prior art. These prior art efforts to communicate across power lines range from simply applying a disturbance to a power line once per power cycle to communicating on a high frequency carrier on the power line. Although many of these communication schemes are functional, they suffer from a number of technical and economical drawbacks that make then unsuited for actual use. For example, U.S. Pat. No. 4,348,582 proposes the power line communication system depicted in the circuit in FIG. 1. To generate a notch 2 in the power signal 4 on the AC line 10, a silicon controlled rectifier 6 (SCR) controlled by a set of control circuitry 8 is gated for a short time, approximately 1 millisecond, before the AC voltage crosses zero from positive to negative. While the SCR 6 is conducting, the voltage applied to the load 12 remains near zero. This creates a notch 2 in the AC power signal 4 as shown in FIG. 2 that is being provided to a load 12. A receiver circuit in the load 12 detects the presence or absence of notches and interprets them as digital data.

There are several disadvantages to the above described approach. First, the transmission rate is only 60 bits per second since the notch can only be introduced on the positive to negative half cycle. The SCR cannot be turned off by its gate signal. Thus, if the SCR is turned on just after a zero crossing, the line will be shorted through the SCR for a half cycle of the power signal which in turn will open the fuse and immediately eliminate the circuit's ability to function.

Therefore, what is needed is a new and improved method of using AC power lines as a communication medium.

Electronic ballasts are typically low cost products that are produced and purchased in relatively large numbers. Therefore, it is also important that any power line communication system for use with electronic ballasts not dramatically increase the cost of the individual ballasts.

BRIEF SUMMARY OF THE INVENTION

An embodiment of the present invention is directed toward a system for providing communications between a central controller and at least one electronic ballast using an AC power line as a communication medium. The system includes a bridge rectifier for rectifying an AC power line signal propagating on the AC power line to produce a rectified power line signal. A shorting member creates a short circuit condition on the AC power lines when the shorting member is activated. The control circuitry includes a phase detection circuit for monitoring an output of the bridge rectifier and determining when to activate the shorting member based thereon. The shorting member is preferably a MOSFET. A receiver in the electronic ballast detects the short circuit condition. A dimming function of the electronic ballasts is controlled based upon a number of short circuit conditions detected by the receiver. The short circuit condition is preferably only created when the AC power line signal has a voltage potential that is less than 10% of a maximum voltage potential of the power line signal or immediately prior to a zero crossing by the AC power line signal.

Another embodiment of the present invention is directed toward an apparatus for enabling communications between an electronic ballast controller and at least one electronic ballast over an AC power line having an AC power signal that is supplying power to the at least one electronic ballast. The apparatus includes a controller configured to selectively short the AC power line approximately when the AC power signal is changing from a negative to a positive polarity or from a positive polarity to a negative polarity to create an extended zero crossing. Preferably, a MOSFET is used to selectively short the AC power line and create the extended zero crossing. The controller includes a bridge rectifier for rectifying the AC power signal and a phase detection circuit for monitoring the output of the bridge rectifier to determine when to short the AC power line. The AC power line is preferably shorted immediately prior to a change in polarity of the AC power signal. A receiver positioned in the at least one ballast is configured to detect the presence or absence of an extended zero crossing when the power line signal changes polarity. The presence or absence of the extended zero crossings is used by the ballasts to control a dimming function of the ballasts.

Yet another embodiment of the present invention is directed toward a method of enabling communications between a controller and at least one electronic ballast on an AC power line supplying power to the at least one electronic ballast. In accordance with the method, the controller is used to selectively extend a zero crossing that occurs when a power signal on the AC power line either transitions from a positive to a negative polarity or from a negative to a positive polarity. The power signal is rectified and the rectified power signal is used to control production of the zero crossing extensions. The zero crossing extensions are created by selectively shorting the AC power line. The selective shorting occurs immediately prior to a change in polarity of the AC power signal. The AC power line is preferably shorted with a MOSFET. The presence or absence of a zero crossing extension when the power line signal changes polarity is detected with the at least one electronic ballast. The presence or absence of the zero crossing extensions is interpreted in accordance with a predetermined code to thereby enable communications between the controller and the at least one electronic ballast. Preferably, the zero crossing extensions are used to communicate a desired dimming amount to the at least one electronic ballast. In such an embodiment, a ratio between extended zero crossings and non-extended zero-crossings is used to communicate information from the controller to the at least one electronic ballast.

DETAILED DESCRIPTION OF THE INVENTION

The present invention is directed toward a power line communication system for providing communication capabilities between a control module and at least one electronic ballast. More particularly, a preferred embodiment of the present invention is directed toward enabling communications between a central controller and a set of electronic dimming ballasts being operated in accordance with an energy management system. These communications are enabled by a power line communication controller that transmits digital data across the AC power lines of a lighting branch circuit and electronic ballasts that filter the data from the AC power supply signal. Since the ratio of ballasts to controllers in a power line communication system is preferably in the range of 20/1 up to 60/1 and cost is a major factor in the marketability of such a system, the preferred system induces a disturbance on the power line that is easily detected with relatively inexpensive circuitry. Embodiments of the present invention also provide an efficient communication protocol that translates the transmitted data into dimming data for the ballasts.

Figure 1:
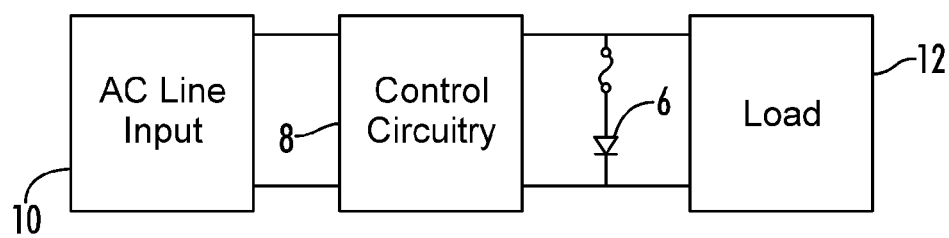
FIG. 1 is a prior art circuit for generating a notch in an AC power signal.
Figure 2:
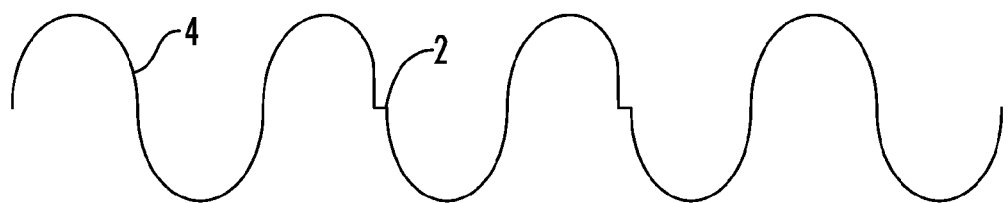
FIG. 2 is a prior art power line communication signal having notches on the positive to negative transitions of the AC power signal.
Figure 3:
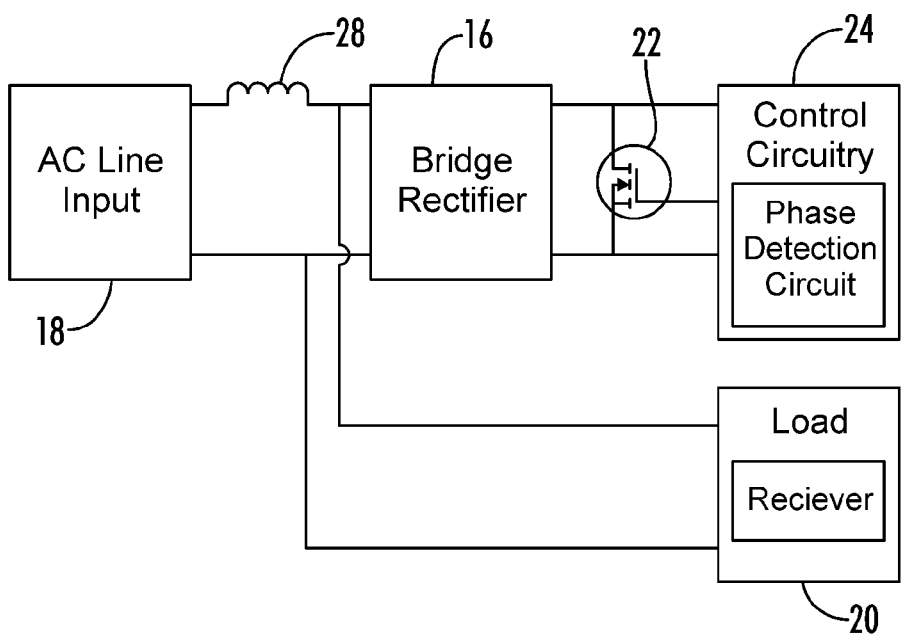
FIG. 3 is a circuit diagram of an embodiment of the present invention.
Figure 4:
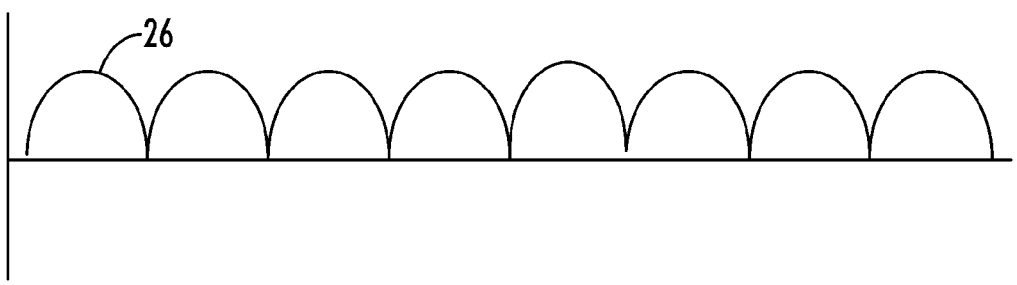
FIG. 4 is a graph of the output of the bridge rectifier of a power line communication circuit constructed in accordance with an embodiment of the present invention.

Referring now to FIG. 3, a power line communication circuit in accordance with the present invention is shown. The circuit consists of a bridge rectifier 16 connected to an AC line input 18 that is supplying a load 20. A MOSFET 22 that is controlled by a set of control circuitry 24 is used to produce a notch in the power signal. In particular, the notch for the power line communication system is induced on the line in the following manner. The control circuitry 24 contains a phase detection circuit that monitors the output voltage 26 of the bridge rectifier 16, as shown in FIG. 4. When the rectified voltage 26 nears the zero-voltage crossing, the MOSFET 22 is turned on. The MOSFET 22 remains on until the current though it returns to zero. While the MOSFET 22 is conducting, the supply voltage to the load 20 is held at near zero. This creates the desired extended zero-voltage crossing or notch that is used to digitally transmit information along the power line. The circuit of FIG. 3 allows transmission of a bit of information every half cycle of the AC waveform. Thus, a sixty Hertz standard power signal can be used to transmit 120 bits per second of data.

An isolation inductor 28 is preferably positioned between the AC line input 18 and the notch generating circuitry 16, 22 and 24. The isolation inductor 28 prevents any notches generated in the power signal being supplied to the load 20 from propagating up the power lines to the AC line input 18 and, thereby, creating disturbances on unintended branches of the power grid. The inductor 28 also allows several different communication systems to be established that are independent and isolated from one another.

Figure 5:
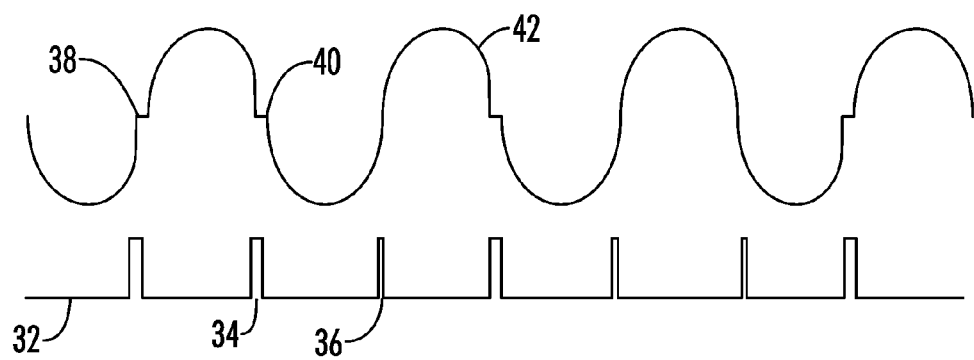
FIG. 5 is a graph of a voltage waveform created by a power line communication circuit constructed in accordance with an embodiment of the present invention.

The bottom waveform 32 of FIG. 5 is the output voltage waveform of a detection circuit constructed in accordance with an embodiment of the present invention showing the notched disturbance on both the rising 38 and falling 40 edge of the AC power line voltage 42. The use of the MOSFET allows control of both the turning-on and turning-off of the notch generating circuit. The detection circuits in the receivers interpret the notches as a series of pulses 32 whose width determines whether the pulse represents a notch 34 or a non-notch 36. Preferably, a wider pulse 34 corresponds to the presence of a notch and a narrower pulse 36 corresponds to the absence of a notch.

In an embodiment of the present invention directed toward an electronic dimming ballast system, each of the ballasts has a detection circuit that monitors the AC power supply signal for the presence or absence of the power line communication system induced notches. A microcontroller in the ballasts then measures the widths of the pulses and determines if a notch is present or not. Those skilled in the art will appreciate that there are an infinite number of ways in which the series of pulses could be decoded and converted into digital data. In an especially preferred embodiment of the present invention, the ratio of notches to non-notches corresponds to the desired brightness level of the electronic dimming ballasts. For example, if no notches are transmitted, each of the ballasts on the branch circuit receiving the notch based communications is set to full brightness. If a notch is induced on every half cycle, each of the ballasts is set to full dim. If every other half cycle has a notch, the ballasts are set to 50% brightness.

The embodiments of the present invention described herein above provide several improvements upon the prior art. First, the use of the bridge rectifier allows notch generation on every half cycle thus allowing 120 bits per second of data transmission, twice the rate of prior art circuits. Second, the use of a MOSFET as the shorting semiconductor device in the power line communication circuits, provides the ability to control both turn-on and turn-off of the shorting device thereby preventing potentially damaging short circuit conditions from occurring. Third, the use of an isolation inductor allows for the use of a power line communication circuit on each branch of a circuit without the induced notches disrupting the supply voltage supplied to the other branches.

Thus, although there have been described particular embodiments of the present invention of a new and useful Digital Control of Electronic Ballasts Using AC Power Lines as a Communication Medium, it is not intended that such references be construed as limitations upon the scope of this invention except as set forth in the following claims.

What is claimed is:

1. A method of enabling communications between a controller and at least one electronic ballast on an AC power line supplying power to said at least one electronic ballast, said method comprising:

rectifying an AC power signal on the AC power line thereby creating a rectified power line signal;

sending the rectified power line signal to the controller which can activate a switch which shorts the AC power line;

using said controller to activate the switch whenever the rectified power line signal approaches a zero crossing for the rectified power line signal thereby extending a zero crossing that occurs when the AC power signal on said AC power line either transitions from a positive to a negative polarity or from a negative to a positive polarity; and detecting a presence or absence of a zero crossing extension when said AC power line signal changes polarity with said at least one electronic ballast and interpreting said presence or absence of said zero crossing extensions in accordance with a predetermined code to thereby enable communications between said controller and said at least one electronic ballast.

2. The method of claim 1 further comprising the step of rectifying said power signal and using said rectified power signal to control production of said zero crossing extensions.

3. The method of claim 1 wherein said zero crossing extensions are created by selectively shorting said AC power line.

4. The method of claim 3 wherein said selective shorting occurs immediately prior to a change in polarity of said AC power signal.

5. The method of claim 1 further comprising using said zero crossing extensions to communicate a desired dimming amount to said at least one electronic ballast.

6. The method of claim 1 wherein selectively extending said zero crossing further comprises shorting said AC power line with a MOSFET.

7. The method of claim 1 further comprising using a ratio between extended zero crossings and non-extended zero-crossings to communicate information from said controller to said at least one electronic ballast.

8. A system for creating notches in an AC power line signal propagating over an AC power line in order to communicate over the AC power line, the system comprising:
   a rectifier for rectifying the AC power line signal on the AC power line to produce a rectified power line signal;
   a switch device connected to the AC power line so that activating the switch device shorts the AC power line; and
   control circuitry connected to the rectifier wherein the control circuitry is adapted to activate the switch device whenever the rectified power line signal reaches a reference voltage thereby creating a notch in the AC power line signal.

9. The system of claim 8 wherein the system further comprises a receiver for detecting the notches in the AC power signal.

10. The system of claim 8 wherein said switch device is a MOSFET.

11. The system of claim 8 wherein the reference voltage is less than 10% of a maximum voltage potential of said power line signal.

12. The system of claim 8 wherein the rectified signal reaches the reference voltage immediately prior to a zero crossing by said power line signal.

13. The system of claim 8 wherein said control circuitry further comprises a phase detection circuit for monitoring the rectified signal to determine when the rectified signal reaches the reference voltage.

14. The apparatus of claim 13, further comprising a rectifier connected to the phase detection circuit so that the phase detection circuit can determine a change in polarity in the power signal.

15. The system of claim 8, further comprising at least one electronic ballast connected to the AC power line wherein a dimming function of the electronic ballast is controlled by the notches in the AC power line signal.

16. The system of claim 8, further comprising:
   AC input terminals for receiving the AC power line signal;
   load output terminals for delivering the AC power line signal to the load;
   a first circuit path coupled to the AC input terminals and having the rectifier, the switch, and the control circuitry; and
   a second circuit path coupled to the AC input terminals and to the load output terminals.

* * * * *